United States Patent [19]
Barrett

[11] 3,940,940
[45] Mar. 2, 1976

[54] PROTECTION METHOD

[75] Inventor: Joseph Edward Barrett, Twickenham, England

[73] Assignee: The British Petroleum Company Limited, London, England

[22] Filed: Nov. 1, 1974

[21] Appl. No.: 520,093

Related U.S. Application Data

[63] Continuation-in-part of Ser. No. 386,621, Aug. 8, 1973, abandoned.

[30] Foreign Application Priority Data

Aug. 12, 1972 United Kingdom............... 37714/72

[52] U.S. Cl............................ 61/1 R; 61/11; 61/50; 137/312; 220/18
[51] Int. Cl.²..................... B65G 5/00; B65D 25/00
[58] Field of Search........... 61/.5, 1 R, 35, 36 R, 50, 61/11; 220/18, 1 B; 137/312, 313, 314

[56] References Cited
UNITED STATES PATENTS

| | | | |
|---|---|---|---|
| 2,460,054 | 1/1949 | Wiggins | 220/75 |
| 3,274,785 | 9/1966 | Lange | 61/.5 |
| 3,383,863 | 5/1968 | Berry | 61/1 R |
| 3,411,654 | 11/1968 | Grabner et al. | 220/1 B |
| 3,415,022 | 12/1968 | Schaefer et al. | 52/169 |
| 3,505,820 | 4/1970 | Draper et al. | 61/1 R |
| 3,736,754 | 6/1973 | Azalbert et al. | 65/.5 |
| 3,736,758 | 6/1973 | Dolring et al. | 61/36 R |

Primary Examiner—Jacob Shapiro

[57] ABSTRACT

A method for protecting ground surfaces from spilled petroleum products, i.e. in bund areas, which comprises covering the surface with a layer of fibre reinforced unsaturated polyester resin applied on top of a membrane which is impervious to the resin and sufficiently flexible to accommodate the ground contours.

13 Claims, 2 Drawing Figures

PROTECTION METHOD

CROSS REFERENCE

This is a continuation-in-part of Ser. No. 386,621 filed Aug. 8, 1973, now abandoned.

The present invention relates to a process for the treatment of ground surfaces to render them impervious to hydrocarbon liquids and the subsequent erection of hydrocarbon liquid storage tanks thereon.

It is common practice for reasons of safety in the oil industry to erect storage tanks for various hydrocarbon liquids in areas known as bunds. These are basin-like areas surrounded by dykes, capable of containing within the bund the total liquid content of the tanks and any tidal wave caused by its escape and thereby localising the harmful effect of any damage to the tanks. Until recently, it has only been necessary for the bund to prevent any overflow of spillage in order to meet the various international safety regulation. However, it has now been found desirable and indeed necessary to meet new regulations for the bund to prevent seepage of the hydrocarbon liquids into the earth on which the bund is located. Furthermore, in existing bunds it is frequently difficult to detect any leakage from a tank in time to prevent serious loss of hydrocarbon liquid.

According to the present invention, a method for erecting a hydrocarbon liquid storage tank comprises forming under the whole area of the tank a continuous, cured glass fibre reinforced unsaturated polyester resin sheet on a membrane which prevents loss of unsaturated polyester resin prior to its cure and which is sufficiently flexible to conform to the contours of the ground surface under the weight of the uncured resin, said sheet having at least one point in its peripheral area outside the area of the tank to which liquid leaking from the tank will flow and be collected.

The cured polyester resin sheet has at least one point in its peripheral area outside the area immediately over which the tank is erected, where liquid leaking from the tank can collect. Any drainage system can be employed. Thus the sheet may be contoured under the tank so that any hydrocarbon liquid leaking from the tank is collected at a point from which it can be piped to an inspection point on the periphery of the sheet. Provided the pipe runs towards the periphery, and hydrocarbon leaking from the tank will rapidly be detected from an inspection for oil at the inspection point. Alternatively, the sheet under the tank can be contoured so that any hydrocarbon liquid leaking from the tank collects in a channel or depression in the sheet. If this channel or depression is made to slope towards an inspection point near the periphery of the sheet, any leakage can be rapidly detected. It will be appreciated that tanks are normally erected on flat, substantially level bases and thus the pipe or channel through which leaking hydrocarbon liquid passes to the inspection point will have to be sloped appropriately to ensure that any escaping liquid passes rapidly to the inspection point. The design of the inspection point may be conventional and most conventional inspection pits or chambers can readily be placed in the peripheral area of the cured, glass fibre sheet.

By hydrocarbon liquids are meant throughout this specification the crude hydrocarbon materials entering and the refined hydrocarbon products leaving oil refineries together with any intermediate products, which materials are liquids at normal temperatures and pressures. Typical examples of these are crude oil per se, straight run naphtha, heavy gas oils, atmospheric residues and motor gasoline reformates, including the high aromatic content, e.g. around 65% reformates.

The expression "unsaturated polyester" is used throughout this specification in its normal sense as covering the polycondensation products of dicarboxylic acids or anhydrides with dihydroxyl alcohols when one of the reactants present during the polycondensation reaction contains a polymerisable double bond. Unsaturated polyesters can be modified by the presence in the polycondensation reaction mixture of monocarboxylic acids, monohydroxyl alcohols and small amounts of polycarboxylic acids or polyhydroxyl alcohols. Particularly valuable unsaturated polyesters are obtained by esterifying saturated dihydric alcohols, such as ethylene glycol, or its precursor ethylene oxide, diethylene glycol, triethylene glycol, trimethylene glycol, $\alpha$-propylene glycol, or its precursor propylene oxide, 1:3 butylene glycol and the bisphenol A adducts with ethylene oxide and propylene oxide with peroxide -unsaturated, $\alpha$, -hydroxy -dicarboxylic acids, such as maleic, fumaric, itaconic and citraconic acids. This type of unsaturated polyester may be modifed by replacing some of the unsaturated hydroquinone, acid, sebacic, phthalic, isophthalic, azealic, tetrahydrophthalic, endomethylene tetrahydrophthalic promoters hexachloroendomethylene tetrahydorphthalic acids.

Unsaturated polyesters are generally cured in the presence of an ethylenically unsaturated monomer capable of copolymerising with the unsaturated polyester. Examples of such monomers are styrene, which is the most commonly employed, vinyl toluene, $\alpha$-methyl styrene, methyl methacrylate, ethylene glycol dimethacrylate, ethyl acrylate, acrylonitrile, vinyl acetate, diallyl phthalate, diallyl maleate and triallyl cyanurate. The rate of setting of unsaturated polyesters and their mixtures with copolymerisable monomers is usually increased by the presence of polymerisation catalysts which include organic peroxides such as benxoyl peroxide, lauryl peroxide, isopropyl benzene hydroperoxide, methyl ethyl ketone peroxide and 1hydroxy cyclohexyl hydroperoxide-1. The rate of cure of the polyester resin may also be modified by the addition of suitable inhibitors, such as hydroquionone, alpha-naphthol, t-butyl catechol, benzaldehyde, alpha-naphthol, t-butyl catechol, benzaldehyde or tetra chloroquinone, and promotors such as certain amines like dimethyl aniline, diethyl aniline, di-n-propyl aniline, dimethyl-para-toluidine, diethyl- $\alpha$-naphthylamine, para-dimethyl-amino azobenzene and dimethyl meta-aminophenol and metallic salts such as vanadium, cobalt and manganese octoates and naphthenates. The use of such curing catalysts, promoters and inhibitors in a balanced system enables the curing of the polyester resin to be brought about in the required time at the varied ambient conditions, i.e. from the high temperatures of Middle Eastern Oil Fields to the low temperatures of some North American Oil Fields, in which the process of the present invention is applicable. In particular, where the ambient temperature is sufficiently low to cause air inhibition of the resin, a wax, such as paraffin wax can be added in an amount from 0.01 to 0.1 wt% based on the weight of the resin.

If required, the resin can be pigmented to enable a more visible laminate to be prepared. Further, filler materials such as carbon black can be added to reduce the possibility of static electricity build up.

The glass fibre reinforcement used in the process of the present invention can be in the form of chopped rovings, chemically bonded chopped fibre mats or continuous strand mat. In a preferred aspect of the present invention, the glass fibre is in the form of chopped rovings.

The membrane can be made of any material which is sufficiently impervious to the chosen unsaturated polyester resin to prevent any substantial quantity of the polyester resin from seeping away from the glass-fibre reinforcement into the ground being treated before the resin has set, and which is sufficiently flexible to enable it to take up the contours of the ground under the weight of the uncured resin to prevent the formation of voids between the set resin layer and the ground which could lead to subsequent mechanical failure of the resin layer.

The preferred membranes are made from thin, flexible sheets of polymeric materials. In particular, polyvinyl chloride and high and low density polyethylene in blown film form are suitable. When using blown high density polyethylene film, it has been found that material of thickness in the range 80 to 200 gauge i.e. 0.0008 to 0.002 inches is suitable and material in the range 100 to 150 gauge, i.e. 0.001 to 0.0015 inches thick is particularly suitable.

The membrane need not be a continuous sheet covering the whole area and can, in practice, consist of a plurality of overlapping strips arranged so that there is sufficient area of overlap between one sheet and the next to prevent any substantial seepage of polyester resin into the ground before the resin has set.

In one aspect of the present invention, the unsaturated polyester resin is pigmented, in order that the protective layer produced is colored and the area of treatment visible.

Either as well as or alternatively to this pigmentation, the protective layer can be coated with a thin layer of mineral material, such as sand with or without rolling prior to the setting of the polyester resin. The layer can then be compacted to the ground layer, with or without contained filler, to improve the compressive properties.

The unsaturated polyester resin is suitably applied to glass-fibre reinforcement on the impervious membrane by any of the methods well known in the art for the preparation of glass-fibre reinforced articles. In a preferred aspect of the present invention the glass-fibre in the form of continuous rovings is fed to an application gun, together with a supply of catalysed unsaturated polyester resin, the glass fibre is chopped into short strands at the gun and sprayed, with the resin, onto the membrane. Alternatively, when the glass-fibre is in mat form, the mat is placed on the membrane and unsaturated polyester resin is applied to the mat, suitably by spraying, and worked, by rolling into the mat to thoroughly impregnate it.

When the storage tank is to be erected in a bund according to the process of the present invention, it is preferred that the layer be continued up to and even over the top of the perimeter wall in order to provide a catch tank for the contents of the storage vessels contained within the bund. The inspection point in the peripheral area of the cured glass-fibre sheet is suitably sited within the bund wall in the embodiment of the invention.

When the process of the present invention is used to provide a foundation for a storage tank, it is preferred that the layer is laid on a pre-prepared load bearing area, suitably consisting of graded and compacted mineral materials, the area being either flat or convex. The storate tank can either be erected directly on top of the impervious layer or, preferably, a further layer of compacted mineral materials can be placed on top of the layer of cured glass-fibre reinforced unsaturated polyester resin.

In the process of the present invention the use of an impervious membrane between the glass-fibre reinforced unsaturated polyester resin sheet and the ground allows proper control of the sheet composition, thickness and performance, prevents possible inhibition of cure of the unsaturated polyester resin by unknown materials in the ground and also avoids unnecessary wastage of unsaturated polyester resins.

An unexpected advantage of the process of the present invention is that tanks erected according to it are surprisingly free from corrosion. In known bund areas the storage tanks have to be protected by cathodic protection and it is found that a positive current is needed to prevent or at least reduce corrosion. When cathodic protection is applied to a tank erected according to the present invention, substantially no current flows thus indicating that the tank is not subject to the same degree of corrosion as a tank erected according to the prior art directly on the bund area surface.

The process for the protection of a bund area according to the present invention is illustrated in the following Example.

EXAMPLE

A circular bund area of 5282 square meters total area including a storage tank foundation was treated by the following procudure.

The area was first approximately leveled and then hollowed out at the centre to make it saucer shaped so that any liquid escaping in the area would gravitate to the centre. A drain was then laid in the centre and connected to a downwardly sloping pipe leading to the periphery of the area. At the periphery an inspection chamber was laid and connected to the pipe.

A 2 meter wide strip of high density blown polyethylene film of 10 micron thickness was laid along a diameter of the bund area, including the drain and the inspection chamber and was cut away to correspond to the surface opening of these two items. The film was coated with a layer of glass fibre reinforced unsaturated polyester resin at a coating weight of 3.6 kg/sq. meter to give a laminate thickness of 2.5mm using a resin to glass ratio of 2.9:1. The resin, Cellobond A 262/249 Ex promoted with cobalt octoate was applied from a Polyspray M30CE machine, in which it was mixed with Butanox M50 catalyst and chopped rovings of E-Glass fibre. The quantities of promoter and catalyst were adjusted to give a gel time of 10–5 minutes at a resin temperature of between 28°–43° to allow consolidation of the laminate. The resin/glass was sprayed over the whole of the membrane strip, excluding the drain and inspection chamber and allowed to overlap marginally onto the substrate. Subsequent strips of membrane were laid either side of the diameter strip, overlapping slightly, and the subsequent resin/glass layers were sprayed to cover the overlap of membranes and to overlap slightly onto the previous resin/glass layers to provide a continuous laminate.

The laminate could be walked on 1 hour after application, and was covered with foundation sand/rock 24 hours after application.

Figure 1:
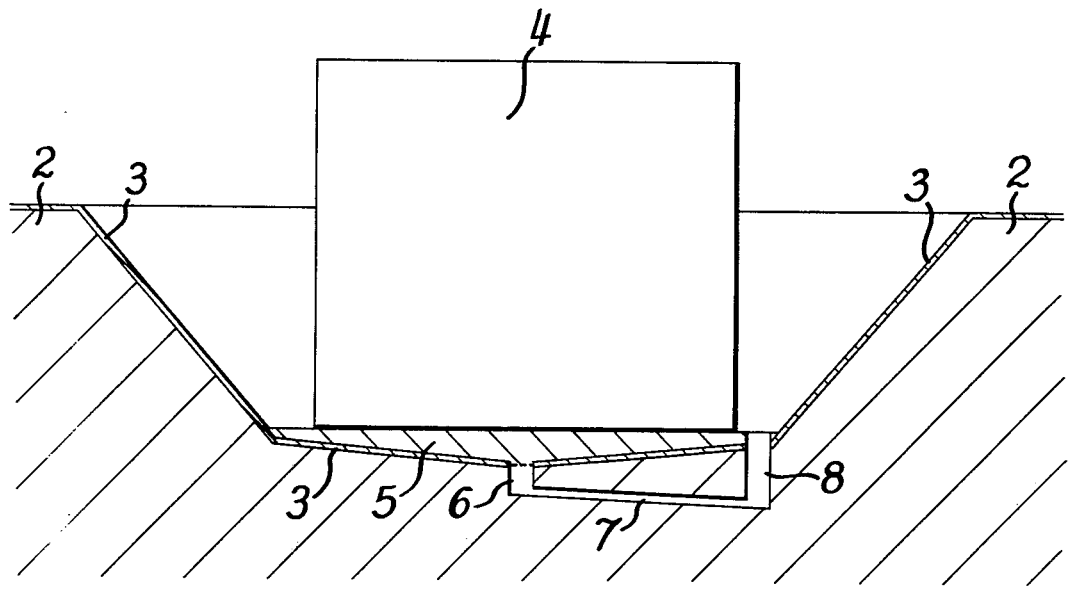
FIG. 1 shows diagramatic presentation of the invention.

In the accompanying drawings FIG. 1 is a diagrammatic representation of the cross section of the bund area described in the example after the erection thereon of an oil storage tank. In the drawing the earth is formed into a saucer shaped area bounded by the bund walls 2. The cured glass fibre reinforced resin sheet 3 covers this area. The tank 4 is mounted on the sand/rock foundations 5. Any oil leaking from the tank will collect in the centre of the saucer shaped bund area where it flows into drain 6 and from there into pipe 7 connecting the drain to the inspection chamber 8 in the periphery of the cured resin sheet covering the substantially level surface of the bund area on which the tank is erected. Any hydrocarbon leaking from the tank collects in the inspection chamber and is easily visible on routine inspection.

Figure 2:
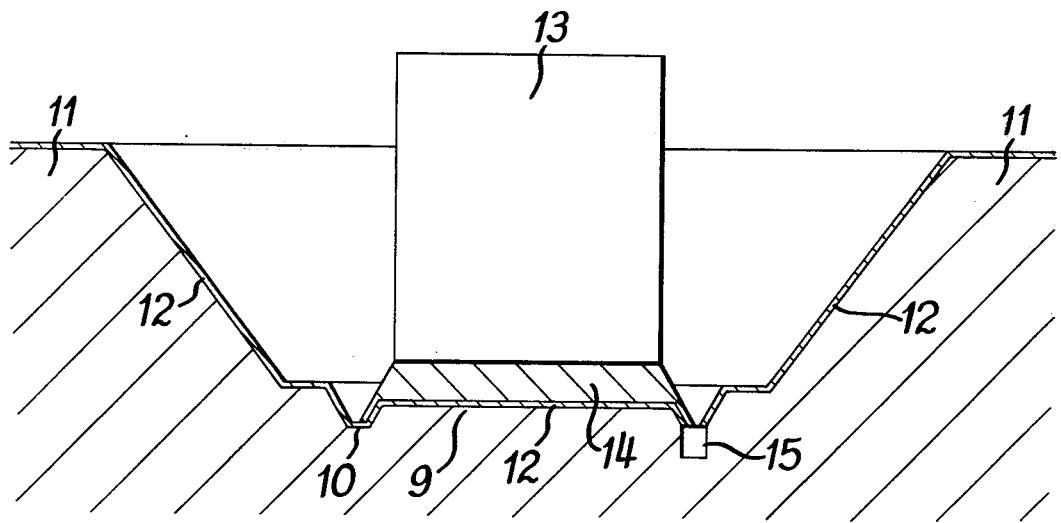
FIG. 2 is a modification of the invention.

FIG. 2 is a diagrammatic representation of a tank erected on a bund area according to a further embodiment of the present invention. In the drawing the earth is formed into a platform 9 surrounded by a shallow ditch 10 and finally by the bund walls 11. A cured glass fibre reinforced resin sheet 12 is laid on a membrane to cover the platform, the ditch and the bund walls. The tank 13 is mounted on a sand/gravel foundation 14. Any oil leaking from the tank will rapidly find its way into the lined ditch where it will eventually collect in inspection chamber 15.

I claim:

1. A system for rendering the earth ground surfaces of a hydrocarbon storage tank bund impervious to hydrocarbon liquid and for detection of hydrocarbon seepage from said tank comprising
    a. a laminate of
        i. a polymeric membrane on the ground surface of said bund, and
        ii. a continuous, glass-fibre reinforced, sheet of a cured unsaturated polyester resin on said membrane,
        said membrane being capable of preventing loss of unsaturated polyester resin prior to its cure and sufficiently flexible to conform to the contours of the ground surface under the weight of the uncured resin, said laminate extending to at least the perimeter of the walls of said bund;
    b. drain means in said laminate within the area to be occupied by said tank;
    c. at least one inspection chamber disposed outside the periphery of said tank and below the bottom of said tank; and
    d. conduit means for conveying by gravity hydrocarbon liquid collecting in said drain means from said laminate to said inspection chamber.

2. The system according to claim 1 wherein said laminate is contoured to allow hydrocarbon liquid to flow by gravity to said drain means.

3. The system according to claim 1 wherein the glass-fibre is in the form of chopped rovings.

4. The system according to claim 1 wherein the glass-fibre is in the form of chemically bonded chopped fibre mat or continuous strand mat.

5. The system according to claim 1 wherein the membrane is blown polyethylene or polyvinyl chloride film.

6. The system according to claim 5 wherein the membrane is blown high density polyethylene film of thickness in the range 0.001 to 0.0015 inches.

7. The system according to claim 1 wherein the membrane is in the form of a plurality of overlapping strips.

8. A system for rendering the earth ground surfaces of a hydrocarbon storage tank bund impervious to hydrocarbon liquid and for detection of hydrocarbon seepage from said tank comprising
    a. a laminate of
        i. a polymeric membrane on the ground surface of said bund, and
        ii. a continuous, glass-fibre reinforced, sheet of a cured unsaturated polyester resin on said membrane,
        said membrane being capable of preventing loss of unsaturated polyester resin prior to its cure and sufficiently flexible to conform to the contours of the ground surface under the weight of the uncured resin, said laminate extending to at least the perimeter of the walls of said bund;
    b. a compacted mineral foundation for said tank disposed on said laminate within said bund; and
    c. at least one inspection chamber disposed outside of and below the area of said laminate occupied by said foundation for collecting by gravity any hydrocarbon seepage from said tank passing through said foundation.

9. The system according to claim 8 wherein the glass-fibre is in the form of chopped rovings.

10. The system according to claim 8 wherein the glass-fibre is in the form of chemically bonded chopped fibre mat or continuous strand mat.

11. The system according to claim 8 wherein the membrane is blown polyethylene or polyvinyl chloride film.

12. The system according to claim 11 wherein the membrane is blown high density polyethylene film of thickness in the range of 0.001 to 0.0015 inches.

13. The system according to claim 8 wherein the membrane is in the form of a plurality of overlapping strips.

* * * * *